US008688736B2

(12) United States Patent
Mehta et al.

(10) Patent No.: US 8,688,736 B2
(45) Date of Patent: Apr. 1, 2014

(54) DETERMINING ACCESSIBILITY OF DATABASE OBJECTS WITH MULTIPLE PARENTS

(75) Inventors: Percy Mehta, Foster City, CA (US); Jesse Collins, San Francisco, CA (US); Kayvaan Ghassemieh, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/371,123

(22) Filed: Feb. 10, 2012

(65) Prior Publication Data

US 2013/0054648 A1    Feb. 28, 2013

Related U.S. Application Data

(60) Provisional application No. 61/527,295, filed on Aug. 25, 2011.

(51) Int. Cl.
  *G06F 17/30* (2006.01)
(52) U.S. Cl.
  USPC ........................................... 707/785
(58) Field of Classification Search
  None
  See application file for complete search history.

(56) References Cited

U.S. PATENT DOCUMENTS

| | | | |
|---|---|---|---|
| 7,366,708 B2* | 4/2008 | Jalali et al. | 707/741 |
| 7,370,344 B2* | 5/2008 | Boozer et al. | 726/2 |
| 7,913,172 B2* | 3/2011 | Rjaibi et al. | 715/741 |
| 2007/0198545 A1* | 8/2007 | Ge et al. | 707/100 |
| 2010/0235907 A1* | 9/2010 | Bowman et al. | 726/21 |

OTHER PUBLICATIONS

Schematic, Task and Event Objects, data model reference, SALESFORCE, SOAP API Developer's Guide, (characterizing products on sale prior to Aug. 2010) 1 page, http://www.salesforce.com/us/developer/docs/api/index_Left.htm#CSHID=sforce_api_objects_event.htm.

* cited by examiner

*Primary Examiner* — Bai D Vu
(74) *Attorney, Agent, or Firm* — Haynes Beffel & Wolfeld LLP; Kenta Suzue

(57) ABSTRACT

The technology performs database access control in a manner that decreases computational cost of the database access control with an object type definition of a database object that permit multiple parent objects. The system determines whether to grant a user access to a database object via a first set of access control paths that do not rely on whether the user has permission to access a minimum number of parent objects of the database object. Responsive to a determination not to grant the user access via the first set of access control paths, the system determines whether to grant the user access to the database object via a second set of access control paths that determine whether the user has permission to access the minimum number of parent objects of the database object.

23 Claims, 7 Drawing Sheets

30

Store of Objects Having Object Type Allowing Multiple Parents

| Tenant ID | Object ID | ... | Primary Object in First Type Set of Polymorphic Parent Objects | Object in Second Type Set of Polymorphic Parent Objects | # of Parent Objects in First Type Set of Polymorphic Parent Objects | # of Parent Objects in Second Type Set of Polymorphic Parent Objects |
|---|---|---|---|---|---|---|
| ... | | | | | | |

Store of Activity Objects

| Tenant ID | Activity ID | Subject | Due Date | ... | Primary Who | What | Who Count | What Count |
|---|---|---|---|---|---|---|---|---|
| Org1 | T1 | Log a call | 01/30/12 | | Jon Amos | Acme Inc | 3 | 1 |
| Org1 | T2 | Follow up with lead at BigLife Inc. | 02/05/12 | | John Lead | | 1 | 0 |
| Org1 | E1 | Meeting with Contacts at BigData Inc. | 12/25/11 | | Carole White | BigData Inc. | 2 | 1 |
| ... | | | | | | | | |

Fig. 3

50
Store of Parent Objects for Objects Allowing Multiple Parents

| Tenant ID | Object ID | ... | Parent Object (e.g. Who / What) | Indicator of Particular Type Set of Polymorphic Parent Objects (e.g. Who / What) |
|---|---|---|---|---|
| ... | ... | | | |

Fig. 5

55
Store of Parents of Activity Objects

| Tenant Id | ... | Activity Id | Activity parent (Who parent / What parent) | Is_What (True for a What parent, False for a Who parent) |
|---|---|---|---|---|
| Org1 | | T1 | Acme Inc | True |
| Org1 | | T1 | Jon Amos | False |
| Org1 | | T1 | Geoff Minor | False |
| Org1 | | T1 | Howard Jones | False |
| Org1 | | T2 | John Lead | False |
| Org1 | | E1 | BigData Inc | True |
| Org1 | | E1 | Carole White | False |
| Org1 | | E1 | Edward Stamos | False |
| ... | | | | |

Fig. 6

DETERMINING ACCESSIBILITY OF DATABASE OBJECTS WITH MULTIPLE PARENTS

RELATED APPLICATION

This application claims the benefit of U.S. Provisional Patent Application No. 61/527,295, entitled, "Methods and Systems for Providing Multiple Parents on a Record in an On-Demand Database System," filed on Aug. 25, 2011. The provisional application is hereby incorporated by reference for all purposes.

BACKGROUND

The technology disclosed relates to database objects with multiple parents. In particular, it relates to performing access control for database objects with multiple parents.

Database systems limit a number of parent objects for database objects. Working around this limit can force a database system user to create extra copies of database objects, driven solely by the need to capture different instances of parent-child relationships with a particular database object. Such extra copies of the same database object are wasteful.

However, relaxing the limit on the number of parent objects is an obstacle to the challenge of performing access control. Modern enterprise database systems have stores, such as tables, with volumes on the order of hundreds of millions or even billions of records of objects. Performing access control on database objects with multiple parent objects is significantly more computationally costly and difficult than on database objects with a single parent object.

Without addressing the computational cost and difficulty of performing access control on database objects with multiple parent objects, it is not practical to relax the limit on the number of parent objects of database objects.

SUMMARY

The specification describes technologies relating to performing database access control with object types that permit multiple parent objects.

One aspect of the technology can be embodied in methods that include the actions of: determining whether to grant a user access to a database object via a first set of access control paths that do not rely on whether the user has permission to access via a minimum number of parent objects of the database object, wherein a definition of the database object allows the database object to have multiple parent objects; and then responsive to a determination not to grant the user access via the first set of access control paths, determining whether to grant the user access to the database object via a second set of access control paths that determine whether the user has permission to access the minimum number of parent objects of the database object.

Another aspect of the technology can be embodied in methods that include the actions of: prior to determining whether to grant the user access to a database object, maintaining a numerical count of a number of parent objects of the database object, wherein a definition of the database object allows the database object to have multiple parent objects; using the numerical count of the number of parent objects of the database object to choose a particular access control path out of a set of access control paths of the user attempting to access the database object; and determining whether to grant the user access to the database object via the particular access control path that determines whether the user has permission to access a minimum number of parent objects of the database object.

Another aspect of the technology can be embodied in methods that include the actions of: prior to determining whether to grant the user access to a database object, maintaining a database store with references to parent objects of the database object, wherein a definition of the database object allows the database object to have multiple parent objects; and using the references to the parent objects of the database object, determining whether to grant the user access to the database object, based on whether the user has permission to access a minimum number of the parent objects of the database object, wherein the minimum number varies with a number of the parent objects of the database object.

Other embodiments of these aspects include corresponding systems, apparatuses, and computer program products.

Particular aspects of one or more implementations of the subject matter described in this specification are set forth in the drawings and the description below. Other features, aspects, and advantages of the subject matter will become apparent from the description, the drawings, and the claims.

BRIEF DESCRIPTION OF THE DRAWINGS

FIG. 2 is an example store of objects having an object type that allows multiple parents objects, with example fields including a field for a maintained numerical count of parent objects.

FIG. 3 is a more detailed example of a store of objects having an object type that allows multiple parents objects, with example fields including a field for a maintained numerical count of parent objects.

FIG. 5 is an example store of parent objects for objects allowed multiple parent objects.

FIG. 6 is a more detailed example of a store of parent objects for objects allowed multiple parent objects.

DETAILED DESCRIPTION

The following detailed description is made with reference to the figures. Preferred embodiments are described to illustrate the present technology, not to limit its scope, which is defined by the claims. Those of ordinary skill in the art will recognize a variety of equivalent variations on the description that follows.

Figure 1:
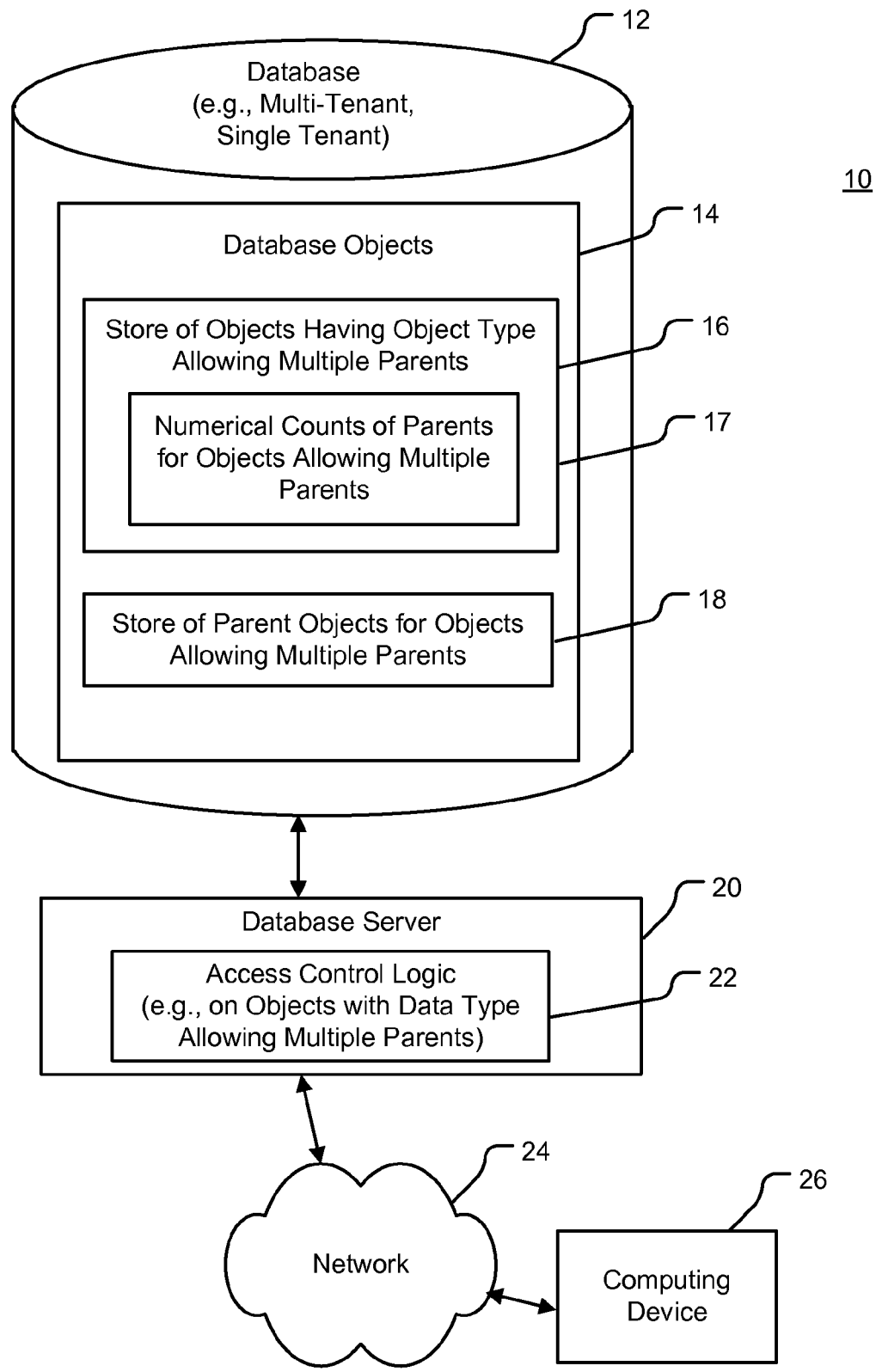
FIG. 1 illustrates a block diagram of an example environment in which access control is performed on database objects with multiple parent objects.

FIG. 1 illustrates a block diagram of an example system 10 in which access control is performed on database objects with multiple parent objects. The system 10 includes a database 12, a database server 20, and a user computing device 26.

The database 12 may be a single tenant or multi-tenant database. The database has database objects 14. Some of these database objects 14 are organized as a database object store or database object table 16 of objects having an object type definition of the objects allowing multiple parents. Others of these database objects 14 are organized as a parent object store or parent object table 18 of parent objects for the database objects of database object table 16. Further objects, not shown, may have an object type definition of the objects that permits a single parent object.

The database server 20 processes incoming and outgoing queries of the database 12. The database server 20 also performs access control on database objects 14 to determine whether a querying user should be granted access to database objects 14 returned from a database query.

The user computing device sends and receives database queries via a network 24 to and from the database server 20.

FIG. 2 is an example store 30 of objects having an object type definition of the objects that allows multiple parent objects, with example fields including a field for a maintained numerical count of parent objects.

The object store 30 has multiple example fields. A "tenant ID" field indicates the organization in a multi-tenant database implementation, and can be removed in a single tenant database implementation. An "object ID" field can indicate a key that identifies a database object, uniquely or uniquely in combination with a tenant ID.

Other fields relate to parent objects. In one implementation, there are multiple type sets of polymorphic parent objects. In this context, polymorphic indicates type polymorphism, in which object types are substitutable. For example, the Who parent object type has subtypes of Contact object type and Lead object type. Accordingly, in the Who type set of polymorphic parent object types, the subtypes of Contact objects and Lead objects are substitutable for each other. For example, a database object can have a field which accepts a reference to a Who parent object; because the Who parent object is polymorphic, this field can accept a reference to a Contact object or a reference to a Lead object.

In another example, a database object may be in a parent-child relationship with a polymorphic parent object. That database object may have at least one field that accepts a reference to polymorphic parent objects of different types, such as a Contact parent object or a Lead parent object. The reference can indicate an object having any object type from a type set of polymorphic parent objects.

Another example has multiple type sets of polymorphic parent objects. A database object has a first set of fields that accept a reference to a polymorphic parent object, indicating an object having any object type from a first type set of polymorphic parent objects (e.g., Who). The database object has a second set of fields that accept a reference to a polymorphic parent object, indicating an object having any object type from a second type set of polymorphic parent objects (e.g., What). Other implementations can have a single type set of polymorphic parent objects, or more than two type sets of polymorphic parent objects. Alternatively, the parent objects may not be polymorphic, such that a field indicates a parent object of a single object type not substitutable with other object types.

Parent object fields of the object store 30 indicate "primary object in a first type set of polymorphic parent objects", "object in a second type set of polymorphic parent objects", "# of parent objects in first type set of polymorphic parent objects", and "# of parent objects in a second type set of polymorphic parent objects".

The database object is permitted to have multiple parent objects in the first type set of polymorphic parent objects. The "primary object in the first type set of polymorphic parent objects" field indicates a selected one of the multiple parent objects in the first type set of polymorphic parent objects. The "# of parent objects in first type set of polymorphic parent objects" field indicates a numerical count of the multiple parent objects in the first type set of polymorphic parent objects of the database object, which can be 0, 1, or more.

In this implementation, the database object is permitted to have at most one parent object in the second type set of polymorphic parent objects. The "object in a second type set of polymorphic parent objects" field indicates the only parent object in the second type set of polymorphic parent objects. In an alternative implementation, the database object is permitted to have multiple parent objects in the second type set of polymorphic parent objects. The "# of parent objects in second type set of polymorphic parent objects" field indicates a numerical count of the multiple parent objects in the second type set of polymorphic parent objects of the database object, which can be 0 or 1.

Parent object fields can be empty if the database object has no objects in the corresponding type set of polymorphic parent objects. The numerical count fields are maintained as parent objects are added to or deleted from the database object.

Another implementation can add an owner field indicating the owner of the object.

FIG. 3 is a more detailed example of a store 35 of objects having an object type definition of the objects that allows multiple parent objects, with example fields including a field for a maintained numerical count of parent objects.

In this example, the Activity object store 35 has Activity objects which can be divided into Task objects and Event objects, with Activity object-relevant fields such as "Subject" and "Due date". The Activity object has fields "Tenant ID" and "Activity ID", similar to "Tenant ID" and "Object ID" in FIG. 2. Task objects can be owned by users, while Event objects can be owned by users or a shared calendar.

In one implementation, the Activity objects have two type sets of polymorphic parent objects, Who parent objects and What parent objects. A Who parent object represents a person and can be divided into, for example, Contact objects and Lead objects. In one example, a user logging a call with a contact, Jon Amos, creates a Task object to log a call and with Jon Amos as the parent Contact object.

The What (also known as "Related To") parent represents a non-person related record such as an Account, Opportunity, Case, etc. (including custom objects defined by users). In one example, if a user creates a Task object to log a call with a contact, the user may relate the task object to a What object representing an ongoing customer support case discussed on the call.

Parent object fields of the Activity object store 35 indicate "Primary Who", "What", "Who Count", and "What Count". In this implementation, the database object is permitted to have multiple "Who" parent objects. The "Primary Who" field indicates a selected one of the "Who" parent objects. The "Who Count" field indicates a numerical count of the "Who" parent objects of the database object, which can be 0, 1, or more.

In one implementation, the database object is permitted to have at most 1 "What" parent object, so the "What" field indicates the only "What" parent object. The "What Count" field indicates a numerical count of the "What" parent objects, which can be 0 or 1. In an alternative implementation, the database object is permitted to have multiple "What" parent objects.

Another implementation can add an owner field indicating the owner of the object.

Figure 4:
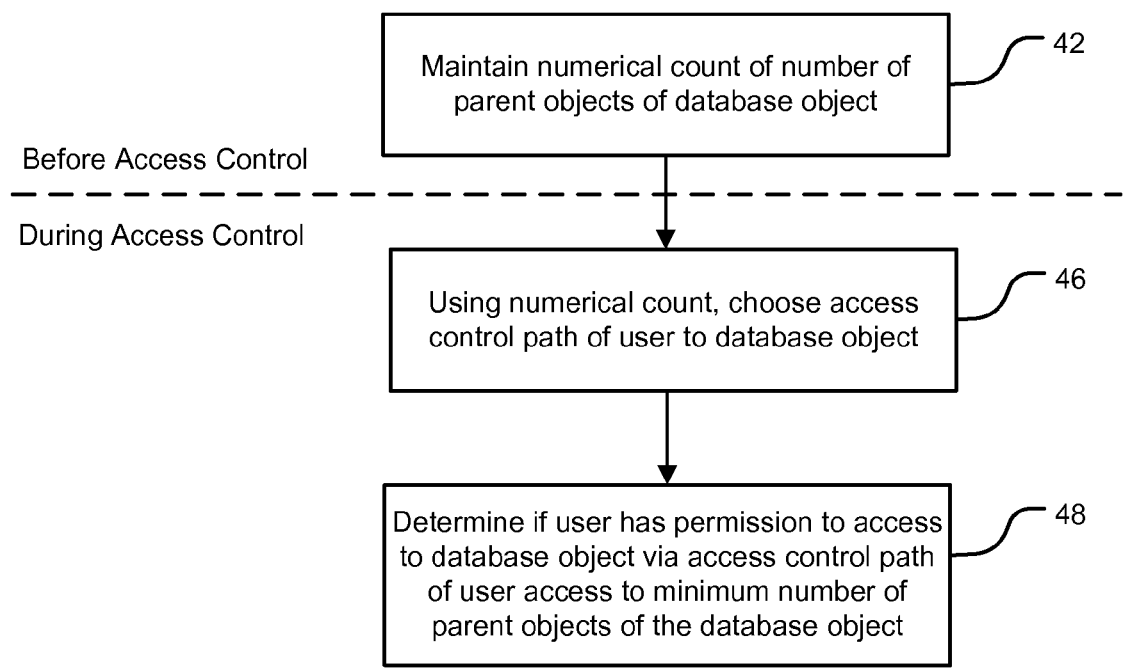
FIG. 4 is a high-level flow chart of one implementation of determining access control for an object with multiple parents, with a maintained numerical count of parent objects.

FIG. 4 is a high-level flow chart of one implementation of determining access control for an object with multiple parents, with a maintained numerical count of parent objects.

Step 42 maintains a numerical count of parent objects of the database object. Examples of the numerical count are shown in FIGS. 2 and 3. Step 42 occurs before access control is performed on the database object. By maintaining the numerical count, at query runtime the system does not have to count the number of parent objects.

The following steps occur during access control. The numerical count of parents objects of the database object, such as numerical counts shown in FIGS. 2 and 3, is accessed. Step 46 chooses an access control path of the user attempting to access the database object, using the numerical count. An example is discussed in further detail on FIG. 8 at step 93. Finally, step 48 determines whether the user has permission to access to the database object via an access control path to a minimum number of parent objects of the database object. Examples are discussed in further detail on FIG. 8 at steps 95-99.

FIG. 5 is an example store 50 of parent objects for objects allowed multiple parent objects, with example fields.

The parent object store 50 has multiple example fields. The "tenant ID" and "object ID" fields can be similar to FIG. 2.

Parent object fields of the parent object store 50 indicate "parent object" and "indicator of which type set of polymorphic objects". The parent object store 50 has records with references to parent objects. For example, if a database object has n parent objects, then the parent object store 50 has n records with references to parent objects. The "parent object" field distinguishes the records for parent objects of a same database object.

The "indicator of which type set of polymorphic objects" field indicates the particular type set of polymorphic parents. In an embodiment with n type sets of polymorphic parents, the "indicator of which type set of polymorphic objects" field can have one of n values to identify one of the n type sets of polymorphic parents.

FIG. 6 is a more detailed example of a store 55 of parent objects for objects allowed multiple parent objects, with example fields.

The parent object store 55 has multiple example fields. The "tenant ID" and "activity ID" keys can be similar to FIG. 3.

Parent object fields of the parent object store 55 indicate "Activity parent" and "Is_What". The parent object store 55 has records with references to parent objects. For example, if an Activity object has n parent objects, then the object store 55 has n records with references to parent objects. The "Activity parent" field distinguishes the records for parent objects of a same Activity object.

The "Is_What" field indicates whether the parent object belongs to the "What" type set of polymorphic parents or the "Who" type set of polymorphic parents. In an embodiment with n type sets of polymorphic parents, the "indicator of particular type set of polymorphic objects" field can have one of n values to identify one of the n type sets of polymorphic parents.

Figure 7:
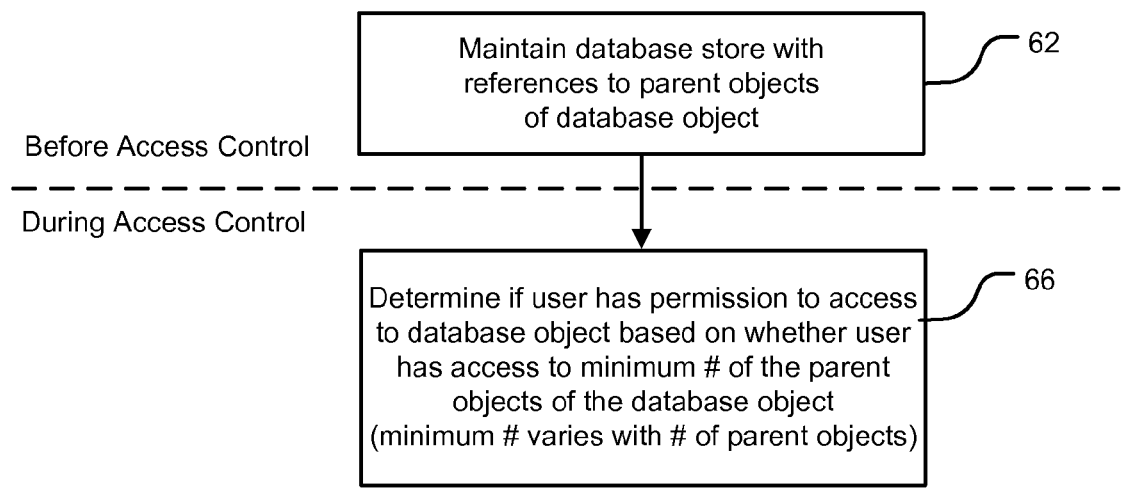
FIG. 7 is a high-level flow chart of one implementation of determining access control for an object with multiple parents, with a store of parent objects.

FIG. 7 is a high-level flow chart of one implementation of determining access control for an object with multiple parents, with a maintained store of parent objects.

Step 62 maintains a database store with records with references to parent objects of the database object. Examples of a database store of parent objects are shown in FIGS. 5 and 6. Step 62 occurs before access control is performed on the database object. By maintaining the store of parent objects, at query runtime the system can find all parent objects at a common store or table.

The following steps occur during access control. References to the parent objects of a database object are accessed, such as from the database stores shown in FIGS. 5 and 6. Finally, step 66 determines whether the user has permission to access to the database object, based on whether the user has permission to access to a minimum number of parent objects. The minimum number varies with the number of parent objects. An example is discussed in further detail on FIG. 8 at step 99.

Figure 8:
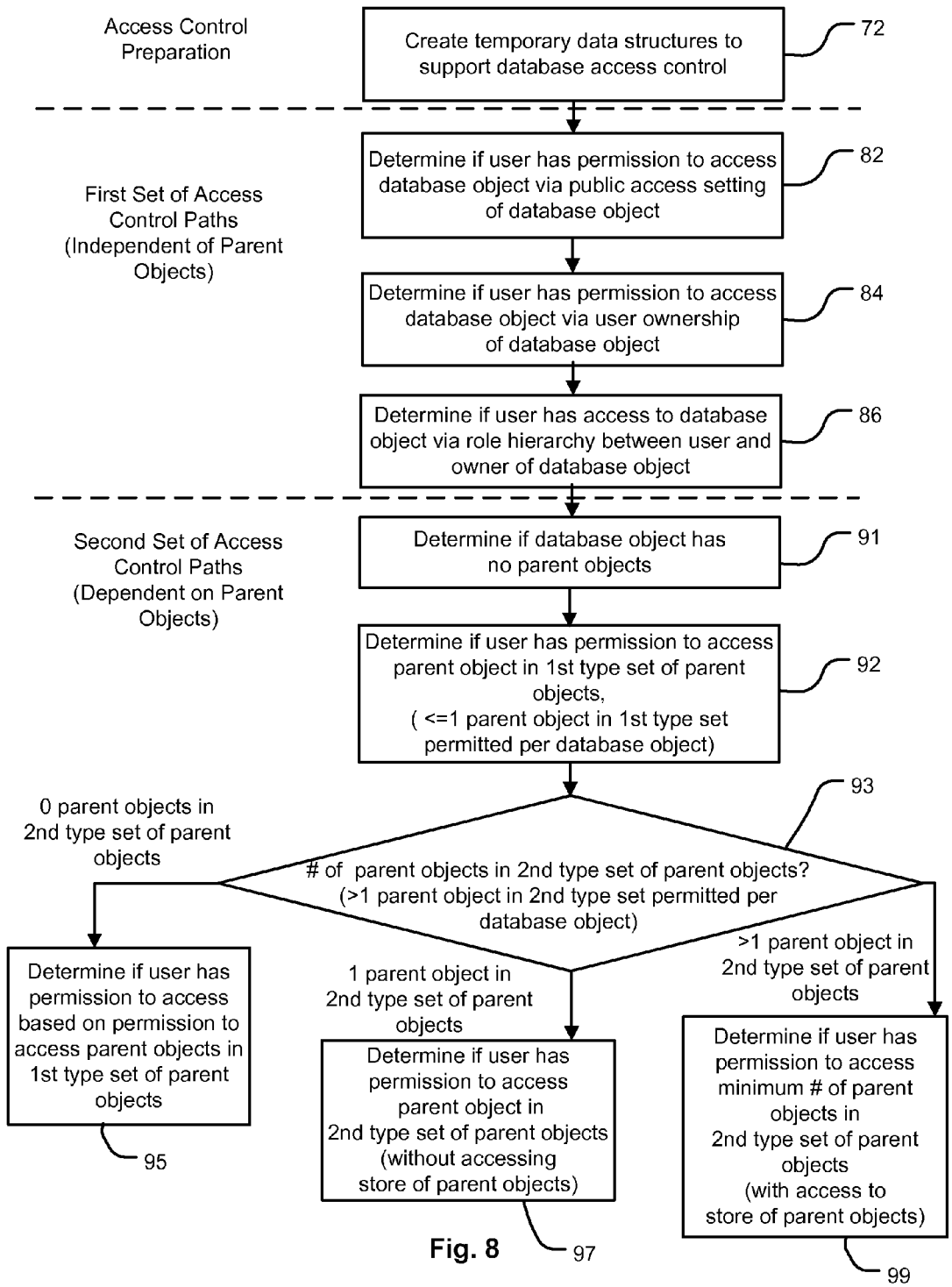
FIG. 8 is a high-level flow chart of one implementation of determining access control for an object with multiple parents, by performing a first set of access control paths independent of parent objects, and then a second set of access control paths dependent on parent objects.

FIG. 8 is a high-level flow chart of one implementation of determining access control for an object with multiple parents. The flow chart is divided into three general groups of steps—access control preparation, a first set of access control paths that are independent of parent objects, and a second set of access control paths that are dependent on parent objects. This approach attempts to grant the user access to a database object via the easier access paths first, and the more difficult access paths last. This efficient implementation defers the computational cost of the most difficult access paths until the exhaustion of alternatives to grant the user access.

First, access control preparation is performed. At step 72, access control preparation is performed. Temporary data stores are created to support database access control. The database system receives a user database query to collect database objects subject to user defined filters. For example, a set of Activity objects are collected that have a due date in January according to user filters. Parent objects exist for many of these collected database objects that have satisfied the user defined filters. All the distinct parent objects of these database objects are collected. The stores shown in FIGS. 2, 3, 5, and 6 can be accessed to assist these steps. In the implementation shown in FIGS. 3 and 5, Activity objects that satisfy user defined filters are collected, and then all distinct Who parent objects and What objects of these Activity objects are collected.

Next, the collected parent objects are checked to keep the parent objects that are accessible to the user, and discard the parent objects that are inaccessible to the user. For example, if the user is the owner of a parent object, the parent object is accessible to the user. Also, if the user has a role hierarchical position above the owner of the parent object, the parent object is accessible to the user. Other ways in which the parent object is accessible to the user can be specific to the parent object type.

At the conclusion of step 72, the parent objects that are accessible to the user are held in a temporary data store, such as one table per type set of polymorphic parent objects, or a combined table for multiple type sets of polymorphic parent objects. In the implementation shown in FIGS. 3 and 5, all distinct Who parent objects that are accessible to the user are held in a temporary store of accessible Whos, and all distinct What parent objects that are accessible to the user are held in a temporary store of accessible Whats.

These temporary stores are not needed until later in the process flow, in particular the second set of access control paths that are dependent on parent objects. However, efficient processing can combine the first and second sets of access control paths into a single database query. So in one implementation, these temporary stores are generated at this time. Other implementations could delay the generation of these temporary stores, at the cost of dividing first and second sets of access control paths into multiple database queries.

In one implementation, to limit the size and simplify processing of these temporary stores, these temporary stores do not include accessible parent objects on the basis of whether the parent object has an access setting that is public rather than private. In one implementation, the access setting is an organization-wide sharing default for types of records. For example, a Lead object type can be private by default in which case by default a Lead object is accessible to the owner only, or public by default in which case by default the Lead object is accessible to the organization. Optionally, the role hierarchy discussed below can override the access setting default. Checking the access setting of the parent object can be delayed until processing the second set of access control paths. In another implementation, these temporary stores can include accessible parent objects on the basis of whether the parent object has an access setting that is public rather than private.

Next, access control is performed according to a first set of access control paths that are independent of parent objects of the database objects. The user database query collected database objects subject to user defined filters, as in step 72. Then access control is performed on the database objects to determine whether the user has permission to access a database object. Various access control methods are attempted from the first set of access control paths. If any of the various access control methods succeeds, then the user has permission to access to the database object, removing the need to perform further access control on the database object.

Step 82 determines whether the user has permission to access the database object via a public access setting of the database object. In some implementations, this step is skipped. The database object may not have a distinct access setting, and can instead rely on an access setting inherited from the parent object(s) of the database object.

Step 84 determines if the user has permission to access the database object via user ownership of the database object. An owner has not just read, but also write access to the database object.

Step 86 determines if the user has permission to access the database object via a role hierarchy relationship between the user and the owner of the database object. A role hierarchy can be a treelike structure that indicates whether each entity in the role hierarchy has a supervisory relationship or a subordinate relationship with another entity in the role hierarchy. Users at any given role level can view, edit, and report on all data owned by or shared with users below them in the hierarchy, unless an organization's sharing model for an object specifies otherwise. In one implementation, an outer join is performed between the Activity objects and a flattened role hierarchy from the point of view of the user. The flattened role hierarchy is a part of the role hierarchy which is specific to a particular user, and presents all of the role hierarchical relationships from the point of the view of the user in a set of records.

Next, access control is performed according to a second set of access control paths that are dependent on parent objects of the database objects. Various access control methods are attempted from the second set of access control paths. If any of the various access control methods succeeds, then the user has permission to access the database object, removing the need to perform further access control on the database object.

Various implementations can vary the number and type of parent objects which must be accessible, in order for the database object to be accessible to the user. For example, user access can require a minimum number (or other threshold quantity) of parent objects to be accessible to the user. At an extreme case, all parents object must be accessible. In an implementation with multiple type sets of polymorphic parent objects, user access can require a minimum number (or other threshold quantity) of parent objects from each type set to be accessible to the user, or alternatively a minimum number (or other threshold quantity) of parent objects from one type set to be accessible to the user. In the event that there are no parent objects in one or more of the type sets of polymorphic parent objects, there can be default rules to disallow user access or allow user access depending on user access to parent objects in other type sets of polymorphic parent objects.

In one example implementation with Who parent objects and What parent objects, user access to the database object can require user access to one Who parent object and one What parent object, with exceptions in the event that there are no parent objects in one or more of the type sets of polymorphic parent objects.

Step 91 determines whether the database object has no parent objects. This can be checked quickly with the maintained counts of parent objects as in FIG. 2. At this point, the only remaining access control paths depend on access via a parent object. So if there are no parent objects, then the user is denied access to the database object.

In an implementation with multiple type sets of polymorphic parent objects, if a database object has no parent objects in any type set of polymorphic parent objects, rather than simply denying user access, user access can be determined based on whether the user has permission to access parent objects in other type sets of polymorphic parent objects. For example, if a database object has no Who parent objects, then user access may be granted based solely on user access to a What parent object.

In one implementation, there are special Activity objects, such as an Event object with a shared calendar as an owner. The special Activity object has maintained counts of Who parent objects and What parent objects, removing the need to perform such counts at runtime. If a special Activity object has no Who parent objects and no What parent objects, then the special Activity object can be accessible to the user according to access controls that are specific to the special Activity object.

Step 92 determines whether the user has permission to access a parent object in a first type set of parent objects (and any other type sets of parent objects where no more than 1 parent object is permitted per database object). When there are multiple type sets of parent objects, it is more efficient to perform access control first on any type set of parent objects which is permitted at most 1 parent object, and then on other type sets of parent objects which are permitted multiple parent objects.

In one implementation, an outer join is performed between the Activity objects and the temporary store of accessible Whats. For example, an outer join can be performed with Activity objects having a form similar to FIG. 3. In another implementation where all type sets of parent objects permit multiple parent objects for a database object, this step can be skipped.

Step 93-99 determine whether the user has permission to access a parent object in a second type set of parent objects (and any other type sets of parent objects where no more than 1 parent object is permitted per database object). The access control method can be chosen depending on the number of parent objects in the type set of parent objects.

Looking up a numerical count of a number of parent objects, such as in FIGS. 2 and 3, can eliminate the computational cost of looking up the store of parent objects, maintained in a parent object store such as in FIGS. 5 and 6. In cases where the numerical count of a number of parent objects is 0 or 1, there is no need to look up the parent objects in the parent object store such as in FIGS. 5 and 6.

If the numerical count of parent objects is 0, then there are no parent objects. There is no need to look up the parent objects in the parent object store. In step 95, user access can be determined based on user access to parent objects in a different type set of polymorphic parent objects, as discussed in step 91.

If the numerical count of parent objects is 1, then there is only 1 parent object which is already in the same record together with the numerical count of parent objects in the object store in FIGS. 2 and 3. In step 97, the parent object listed in the object store such as in FIGS. 2 and 3, is checked for whether the access setting is public rather than private. If the access setting is not public, the system checks whether the parent object is in the temporary data store of accessible parent objects from step 72.

If the numerical count of parent objects exceeds 1, step 99 follows. In step 99, the multiple parent objects are looked up in an object store, such as in FIGS. 5 and 6. Because the object store of FIGS. 2 and 3 indicates at most one parent object per type set of polymorphic objects, looking up the object store of FIGS. 2 and 3 is insufficient to find all the parent objects for a database object. After finding all the parent objects of the database object, then the database is accessible to the user, if a minimum number of the parent objects is accessible to the user. For example, a parent object is accessible if the parent object has an access setting that is public rather than private, or if the parent object is in the temporary store of parent objects from step 72.

In one implementation, if the Who count of an Activity object exceeds 1 (from FIG. 3, for example), then all the Who parent objects of the Activity object are found (from FIG. 6, for example). The user has permission to access the Activity object, if the user has permission to access a minimum number of the Who parent objects of the Activity object. A Who parent object is accessible if the Who parent object has an access setting that is public rather than private, or if the Who parent object is in the temporary store of accessible Whos from step 72.

If none of the first set of access control methods and none of the second set of access control methods succeeds, then the user does not gain access to the database object.

EXAMPLE CODE

The example code uses the following tables:
activities—Table of activity objects (task and event objects)
activity_parents—Table of polymorphic parents for each activity
user_hierarchies—Table that flattens out the role hierarchy, returning all the users that are in roles below that of the viewing user, and also including the user.
calendar_sharing—Table that includes access information for a shared calendar for different users
secure_whats—Temporary table holding the set of accessible What parent objects
secure_whos—Temporary table holding the set of accessible Who parent objects The following Oracle SQL code is an example of the described technology.

```
select
      t.activity_id,
      t.subject,
      t.due_date
from
activities t,              -- table/store of database objects (Activity objects in one implementation)
secure_whats secwhat,      -- temporary table of accessible Whats
user_hierarchies us1       -- table / store representing flattened user hierarcy
where (t.what_id = secwhat.entity_id(+))    -- outer join with table of accessible Whats
and (t.owner = us1.user_id(+))              -- outer join with user hierarchy table
and (t.organization_id = 'Org1')            -- filter out a specific tenant in multi-tenant system
and (1 = CASE
      WHEN us1.user_id is not null THEN     -- grant access via role based access
      1
      WHEN (t.activity_type = "event"       -- grant access to an event with no parents
                                            -- that is owned/present on accessible calendar
            and t.owner like 'Calendar %'
            and t.who_count = 0
            and t.what_count = 0
            and exists (select 1 from calendar_sharing s
                  where s.organization_id = 'Org1'
                  and s.calendar_id = t.owner
                  and s.is_accessible = 'true'
                  and s.user_id = '<viewing_user>')) THEN
      1
      WHEN t.who_count = 0 and t.what_count = 0 THEN -- deny access due to absence
                                            -- of any parents and failure to grant
                                            -- access via first set of access paths
      0
      WHEN secwhat.entity_id is not null    -- if have access to the What or
                                            -- the What has a public type look further
            or (t.what_id in '<list of public what types') THEN
            CASE
                  WHEN t.who_count = 0 THEN -- if no Whos (who count is 0) then grant access
                  1
                  WHEN t.who_count = 1      -- if just have 1 Who (who count is 1)
                                            -- look at Primary Who on Activity table and not
                                            -- access activity_parents table with records of parent
                                            -- objects
                        and exists (select 1
                        from dual
                        where 1 = CASE
                              WHEN (t.who_id in '<list of public who types') THEN
```

```
                    1           -- grant access as Primary Who is of a public type
                exists (select 1
                from secure_whos secwho
                    where secwho.entity_id = t.who_id) THEN
                    1           -- grant access as Primary Who is in the temporary
                                -- table holding all accessible Whos
                ELSE
                    0           -- disqualify Primary Who as it is not accessible
            END) THEN
        1
        WHEN t.who_count > 1       -- if have more than 1 Who look up
                                   -- Whos in activity_parents table. In one
                                   -- implementation access is granted if any of the
                                   -- Who's is accessible
                and exists (select 1
                    from activity_parents tar
                    where tar.organization_id = 'Org1'
                    and tar.activity_id = t.activity_id
                    and tar.is_what = '0'
                    and 1 = CASE
                    WHEN (tar.activity_parent_id in '<list of public who types') THEN
                    1           -- grant access if any of the Who's is of a public type
                    WHEN exists (select 1
                        from secure_whos secwho
                        where secwho.entity_id = tar.activity_parent_id) THEN
                    1           -- grant access if any of the Who's is
                                -- present in temporary table holding all
                                -- accessible Whos
                    ELSE
                    0           -- disqualify the Who that doesn't meet any
                                -- of the above criteria
                    END) THEN
        1
        ELSE
            0                   -- deny access to Activity due to
                                -- no access to at least one Who parent
    END
    ELSE
    0                           -- deny access as none of the access paths succeeded
    END);
```

Figure 9:
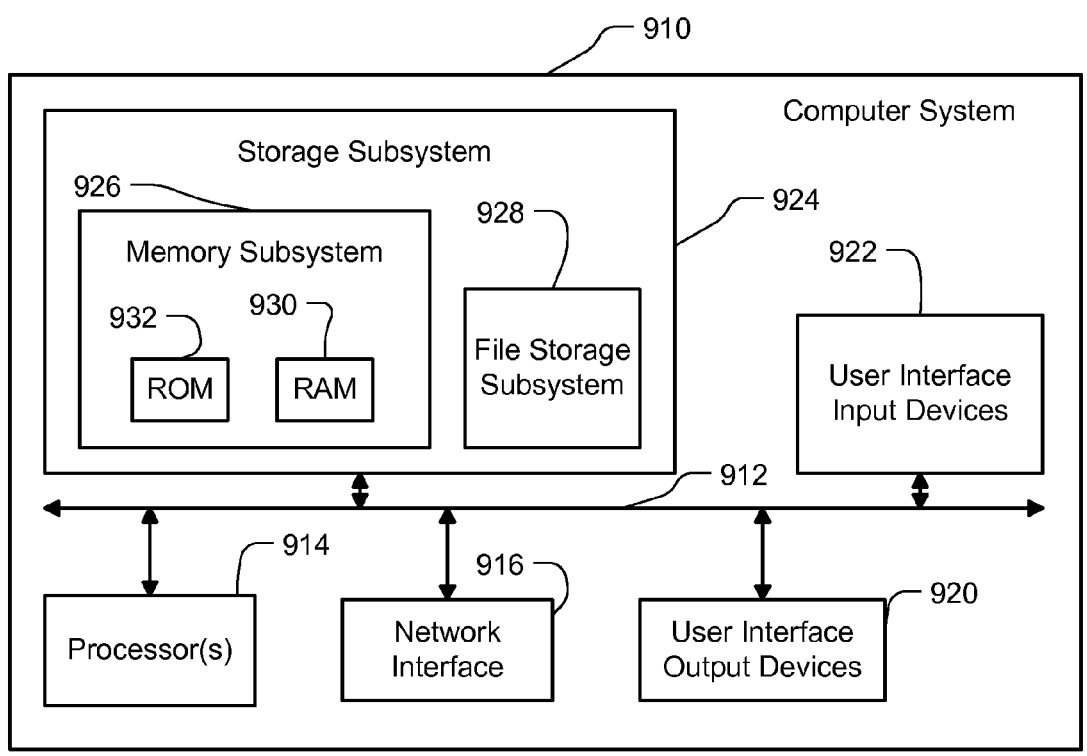
FIG. 9 is a block diagram of an example computer system.

FIG. 9 is a block diagram of an example computer system, according to one implementation. Computer system 910 typically includes at least one processor 914 which communicates with a number of peripheral devices via bus subsystem 912. These peripheral devices may include a storage subsystem 924 including, for example, memory devices and a file storage subsystem, user interface input devices 922, user interface output devices 920, and a network interface subsystem 916. The input and output devices allow user interaction with computer system 910. Network interface subsystem 916 provides an interface to outside networks, including an interface to communication network 110, and is coupled via communication network 110 to corresponding interface devices in other computer systems.

User interface input devices 922 may include a keyboard; pointing devices such as a mouse, trackball, touchpad, or graphics tablet; a scanner; a touchscreen incorporated into the display; audio input devices such as voice recognition systems and microphones; and other types of input devices. In general, use of the term "input device" is intended to include all possible types of devices and ways to input information into computer system 910 or onto communication network 110.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. These software modules are generally executed by processor 914 alone or in combination with other processors.

Memory 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative embodiments of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as a one example. Many other configurations of computer system 910 are possible having more or fewer components than the computer system depicted in FIG. 9.

One aspect of the technology can be embodied in methods that include the actions of: determining whether to grant a user access to a database object via a first set of access control paths that do not rely on whether the user has permission to access via a minimum number of parent objects of the database object, wherein a definition of the database object allows the database object to have multiple parent objects; and then responsive to a determination not to grant the user access via the first set of access control paths, determining whether to grant the user access to the database object via a second set of access control paths that determine whether the user has permission to access the minimum number of parent objects of the database object.

Another aspect of the technology can be embodied in methods that include the actions of: prior to determining whether to grant the user access to a database object, maintaining a numerical count of a number of parent objects of the database object, wherein a definition of the database object allows the database object to have multiple parent objects; using the numerical count of the number of parent objects of the database object to choose a particular access control path out of a set of access control paths of the user attempting to access the database object; and determining whether to grant the user access to the database object via the particular access control path that determines whether the user has permission to access a minimum number of parent objects of the database object.

Another aspect of the technology can be embodied in methods that include the actions of: prior to determining whether to grant the user access to a database object, maintaining a database store with references to parent objects of the database object, wherein a definition of the database object allows the database object to have multiple parent objects; and using the references to the parent objects of the database object, determining whether to grant the user access to the database object, based on whether the user has permission to access a minimum number of the parent objects of the database object, wherein the minimum number varies with a number of the parent objects of the database object.

Other embodiments of these aspects include corresponding systems, apparatuses, and computer program products.

These and other embodiments can optionally include one or more of the following features.

The method may further include choosing a particular access control path to the database object, depending on a number of parent objects of the database object.

The method may further include: prior to determining whether to grant the user access to the database object, maintaining a numerical count of a number of parent objects of the database object; and using the numerical count of the number of parent objects of the database object to choose a particular access control path out of the second set of access control paths of the user attempting to access the database object.

The method may further include: prior to determining whether to grant the user access to the database object, maintaining a database store with references to parent objects of the database object; and using the references to the parent objects, determining whether to grant the user access to the database object based on whether the user has permission to access to the minimum number of the parent objects.

The database object has a plurality of polymorphic parent objects each having one of a plurality of parent object types.

The database object has multiple type sets of polymorphic parent objects, and the user is granted access to the database object, responsive to the user having access to at least one parent object in a first type set of polymorphic parent objects and to least one parent object in a second type set of polymorphic parent objects.

The database object has multiple type sets of polymorphic parent objects, and the user is granted access to the database object, responsive to the user having access to at least one parent object in a first type set of polymorphic parent objects and the database object having no parent objects in a second type set of polymorphic parent objects.

The database object represents any of a business activity and a calendar appointment, and a definition of the database object allows multiple type sets of polymorphic parent objects, including a first type set of polymorphic parent objects that represent a person and a second type set of polymorphic parent objects that represent other than a person.

Whether the user has permission to access a particular parent object of the data object, is based on an access setting of the particular parent object, the access setting having one of at least a public setting and a private setting.

Whether the user has permission to access a particular parent object of the data object, is based on a role hierarchical position between the user and an owner of the particular parent object Whether the user has permission to access a particular parent object of the data object, is based on the user being an owner of the particular parent object.

A parent-to-child relationship between a particular parent object and the database object is characterized by a direction of inheritance of permission to access the database object from the particular parent object to the database object.

While the present technology is disclosed by reference to the preferred embodiments and examples detailed above, it is understood that these examples are intended in an illustrative rather than in a limiting sense. Computer-assisted processing is implicated in the described embodiments. Accordingly, the present technology may be embodied in methods for determining whether to grant a user access to a database object, systems including logic and resources to determine whether to grant a user access to a database object search, systems that take advantage of computer-assisted methods for determining whether to grant a user access to a database object, media impressed with logic to determine whether to grant a user access to a database object, data streams impressed with logic to determine whether to grant a user access to a database object, or computer-accessible services that carry out computer-assisted methods for determining whether to grant a user access to a database object. It is contemplated that modifications and combinations will readily occur to those skilled in the art, which modifications and combinations will be within the spirit of the technology and the scope of the following claims.

We claim as follows:

1. A computer-implemented method, including:
    determining whether to grant a user access to a database object via a first set of access control paths that do not rely on whether the user has permission to access via a minimum number of parent objects of the database object, wherein a definition of the database object allows the database object to have multiple parent objects; and then
    responsive to a determination not to grant the user access via the first set of access control paths, determining whether to grant the user access to the database object via a second set of access control paths that determine whether the user has permission to access to the minimum number of parent objects of the database object.

2. The method of claim 1, further including:
choosing a particular access control path to the database object, depending on a number of parent objects of the database object.

3. The method of claim 1, further including:
prior to determining whether to grant the user access to the database object, maintaining a numerical count of a number of parent objects of the database object; and
using the numerical count of the number of parent objects of the database object to choose a particular access control path out of the second set of access control paths of the user attempting to access the database object.

4. The method of claim 3, further including:
responsive to the numerical count of the number of parent objects of the database object exceeding 1, accessing a database store with references to parent objects of the database object; and
using the references to the parent objects, determining whether to grant the user access to the database object based on whether the user has permission to access the minimum number of the parent objects.

5. The method of claim 1, wherein:
the database object has a plurality of polymorphic parent objects each having one of a plurality of parent object types.

6. The method of claim 1, wherein:
the database object has multiple type sets of polymorphic parent objects, and the user is granted access to the database object, responsive to the user having access to at least one parent object in a first type set of polymorphic parent objects and to least one parent object in a second type set of polymorphic parent objects.

7. The method of claim 1, wherein:
the database object has multiple type sets of polymorphic parent objects, and the user is granted access to the database object, responsive to the user having access to at least one parent object in a first type set of polymorphic parent objects and the database object having no parent objects in a second type set of polymorphic parent objects.

8. The method of claim 1, wherein:
the database object represents any of a business activity and a calendar appointment, and a definition of the database object allows multiple type sets of polymorphic parent objects, including a first type set of polymorphic parent objects that represent a person and a second type set of polymorphic parent objects that represent other than a person.

9. The method of claim 1, wherein:
whether the user has permission to access a particular parent object of the data object, is based on an access setting of the particular parent object, the access setting having one of at least a public setting and a private setting.

10. The method of claim 1, wherein:
whether the user has permission to access a particular parent object of the data object, is based on a role hierarchical position between the user and an owner of the particular parent object.

11. The method of claim 1, wherein:
whether the user has permission to access a particular parent object of the data object, is based on the user being an owner of the particular parent object.

12. The method of claim 1, wherein a parent-to-child relationship between a particular parent object and the database object is characterized by a direction of inheritance of permission to access the database object from the particular parent object to the database object.

13. The method of claim 1, further including:
prior to determining whether to grant the user access to the database object, maintaining a database store with references to parent objects of the database object; and
using the references to the parent objects, determining whether to grant the user access to the database object based on whether the user has permission to access the minimum number of the parent objects.

14. A computer-implemented method, including:
prior to determining whether to grant the user access to a database object, maintaining a numerical count of a number of parent objects of the database object, wherein a definition of the database object allows the database object to have multiple parent objects;
using the numerical count of the number of parent objects of the database object to choose a particular access control path out of a set of access control paths of the user attempting to access the database object; and
determining whether to grant the user access to the database object via the particular access control path that determines whether the user has permission to access a minimum number of parent objects of the database object.

15. The method of claim 14, wherein:
whether the user has permission to access a particular parent object of the data object, is based on an access setting of the particular parent object, the access setting having one of at least a public setting and a private setting.

16. The method of claim 14, wherein:
whether the user has permission to access a particular parent object of the data object, is based on a role hierarchical position between the user and an owner of the particular parent object.

17. The method of claim 14, wherein:
whether the user has permission to access a particular parent object of the data object, is based on the user being an owner of the particular parent object.

18. The method of claim 14, wherein a parent-to-child relationship between a particular parent object and the database object is characterized by a direction of inheritance of permission to access the database object from the particular parent object to the database object.

19. A computer-implemented method, including:
prior to determining whether to grant the user access to a database object, maintaining a database store with references to parent objects of the database object, wherein a definition of the database object allows the database object to have multiple parent objects; and
using the references to the parent objects of the database object, determining whether to grant the user access to the database object, based on whether the user has permission to access a minimum number of the parent objects of the database object, wherein the minimum number varies with a number of the parent objects of the database object.

20. The method of claim 19, wherein:
whether the user has permission to access a particular parent object of the data object, is based on an access setting of the particular parent object, the access setting having one of at least a public setting and a private setting.

21. The method of claim 19, wherein:
whether the user has permission to access a particular parent object of the data object, is based on a role hierarchical position between the user and an owner of the particular parent object.

22. The method of claim 19, wherein:
whether the user has permission to access a particular parent object of the data object, is based on the user being an owner of the particular parent object.

23. The method of claim 19, wherein a parent-to-child relationship between a particular parent object and the database object is characterized by a direction of inheritance of permission to access database object from the particular parent object to the database object.

* * * * *